United States Patent [19]

Murphy

[11] 3,837,875
[45] Sept. 24, 1974

[54] COMPOSITION FOR CLEANING, SEALING, PRESERVING, PROTECTING AND BEAUTIFYING HOST MATERIALS

[76] Inventor: John A. Murphy, 920 E. 36th Pl., Tulsa, Okla. 74105

[22] Filed: Jan. 19, 1973

[21] Appl. No.: 325,109

[52] U.S. Cl.................. 106/264, 106/226, 106/228, 106/253
[51] Int. Cl............................................. C08h 9/00
[58] Field of Search ............ 106/226, 228, 264, 253

[56] References Cited
UNITED STATES PATENTS

| | | | |
|---|---|---|---|
| 1,108,395 | 8/1914 | Rappard | 106/228 |
| 2,445,637 | 7/1948 | Rummelsburg | 106/226 X |

OTHER PUBLICATIONS

Copper: The Science and Technology of the Metal, Its Alloys and Compounds, Allison Butts(ed.), Reinhold Publishing Corp., New York, 1954, page 351.

Primary Examiner—Morris Liebman
Assistant Examiner—E. Suzanne Parr
Attorney, Agent, or Firm—Victor J. Evans & Co.

[57] ABSTRACT

A composition for indepth cleaning, sealing, preserving, protecting and beautifying host materials consisting of a mixture of boiled linseed oil, turpentine, pine oil, a dryer and atomized metallic copper with the copper being present in a ratio of about 28 parts per million. The composition is applied to the host material such as terrazzo floors, wood surfaces, furniture, panelling, marble, gem stones, artifacts, glass, plexiglas, metals, fiberglas, cement, brick, vinyl and other type flooring. The composition seals, fills, polishes, cleans, serves as a bacteriacide, pesticide and fungicide. The composition has no toxic properties upon contact with the skin.

1 Claim, No Drawings

3,837,875

COMPOSITION FOR CLEANING, SEALING, PRESERVING, PROTECTING AND BEAUTIFYING HOST MATERIALS

BACKGROUND OF THE INVENTION

Field of the Invention

The present invention relates to compositions for cleaning, sealing, preserving, protecting and beautifying host materials.

SUMMARY OF THE INVENTION

The instant composition includes boiled linseed oil, turpentine, pine oil, a dryer, and atomized metallic copper with the copper being present in solution in the final composition in at least 0.0028 percent by weight.

The primary object of the invention is to provide a composition of the class described above which will serve as a bacteriacide and fungicide as well as a pesticide while cleaning, sealing, preserving, protecting and beautifying the host material.

Other objects and advantages will become apparent in the following specification.

DESCRIPTION OF THE PREFERRED EMBODIMENT

The present invention embodies and embraces the use of metallic copper in its unoxidized and atomic condition. Its use embraces and relates to its solubility in oil or oils containing organic acids as the solvent, and devoid of inorganic solvents. Such an oil is boiled linseed oil. The purpose of using boiled linseed oil is to eliminate as far as possible, the incorporation of inorganic acids in the composition so that the end product will not acquire acidic, corrosive characteristics. A cleaning, sterilizing and aromatic oil in the form of pine oil is incorporated into the composition. The composition also includes turpentine as a drying and cleaning oil since this is also devoid of inorganic acids.

The use of unoxidized atomic copper in the composition is to obtain the advantage of the value attached to copper as an element which are its natural and inherent property of not supporting organic life and its property of prohibiting hydration, and in addition thereto the catalytic properties of elemental copper in its smallest divisible condition.

The elimination of inorganic acids from the composition while eliminating corrosion as a factor, permits finishes and polishes that protect rather than cause element damage to the surface to which it may be applied. All evaporative type dryers, specifically petroleum derivatives are avoided.

The use of copper in solution in the instant composition is extremely effective in eliminating hydration along with bacteria infestation. The copper in my composition has catalytic properties which vastly increases the effectiveness of the composition beyond that which would be normally expected.

The composition penetrates deeper into the host materials when applied and appears to become a compositional part of the host materials due to the catalytic action so as to impart to the host material properties of protection against bacteria invasion and hydration.

The present composition requires no heat other than the ambient temperature for its effective assimilation and composition. The composition when deeply penetrating the host material chemically combines therewith to provide indepth hardening and toughening of the host material, resulting from the destruction of bacteria and fungi.

Objects finished with this composition will not crack, check or peel, and never need applications of waxes, oil and etc. to renew its appearance. The composition does not build up when applied topically, and does not film or promote filming on the surface. Surfaces treated with the material display a smooth, filmless clean surface permitting the exposure at all times of the unique beauty and structure of the host materials. This is particularly noticeable when the composition is applied as the initial finish on objects of value and beauty as furniture, marble, gem stones etc..

The composition is useful in polishing and cleaning glass and removing bacterial and electrostatic filming thereon leaving the glass perfectly clean, clear and easily cleaned with a minimum of effort and maintenance. Plexiglas is similarly benefitted making the composition extremely effective for use on windshields of automobiles, airplanes, boats, motorcycles and the like whether constructed of glass or plexiglas.

The composition may be used as a thinner for other materials such as paint, varnishes, lacquers and the like greatly reducing the friction in painting and adding coverage and life to the coloring of such paints. From the above it can be seen that my composition has many and varied uses in many different fields of endeavor.

The composition is manufactured proportionally as follows. One hundred and twentyeight ounces of boiled linseed oil, preferably filtered, are placed in a container with mixing equipment emersed therein. Into the linseed oil 1 fluid ounce of atomized metallic copper is poured and the mixing is carried on for at least 10 minutes and for longer periods as required. These operations are carried out at normal air pressure with the temperature staying between 100° Fahrenheit and 60° Fahrenheit under normal conditions. When satisfactory blending is assured the mixture is allowed to sit and remain undisturbed for a period of 7 days or longer and under the same conditions of pressure and temperature as given above. Periodic testing to determine the settlement of solids should be performed, however, the full 7 days should be allowed. Upon the end of 7 days settlement the liquid is drawn off by decanting methods to leave the sediment undisturbed and is placed in another container.

To each gallon of basic liquid resulting from the above there is added 1 pint of turpentine, one half pint of pine oil and one quarter pint of a cobalt type dryer. This mixture is then mixed thoroughly and permitted to set undisturbed for a period of a minimum of 3 days.

This produces a concentrate. One quart of concentrate is then mixed with 1 gallon of boiled linseed oil, 1 pint of turpentine, one half pint of pine oil and one quarter pint of cobalt type dryer. This final mixture is thoroughly blended and allowed to set undisturbed for period of at least 7 days time.

The product is now ready for the market. The final product contains approximately 0.0028 percent by weight of copper with the remaining copper of the 1 ounce originally added being present in the sediment of the original mixture. The sediment incorporating the undisolved copper is recovered for re-use.

The finished composition is then used for indepth cleaning, sealing, preserving, protecting and beautifying host materials while simultaneously serving as a fungicide, bacteriacide and a pesticide.

While the example above gives specific quantities of the ingredients it should be understood that the quantities of ingredients may be varied to a minor extent without departing from the spirit of the invention.

What is claimed is:

1. A cleaning, sealing, preserving, protecting and beautifying composition consisting of boiled linseed oil, turpentine, pine oil, a dryer and unoxidized and atomic copper in solution, said composition including 128 liquid ounces of boiled linseed oil, 16 liquid ounces turpentine, 8 liquid ounces pine oil, 4 liquid ounces of a cobalt type dryer, and about 28 PPM of unoxidized and atomic copper in solution.

\* \* \* \* \*